(12) United States Patent
Sung et al.

(10) Patent No.: US 12,542,144 B2
(45) Date of Patent: Feb. 3, 2026

(54) GUIDED SPEECH ENHANCEMENT NETWORK

(71) Applicant: Google LLC, Mountain View, CA (US)

(72) Inventors: George Chiachi Sung, San Diego, CA (US); Yang Yang, San Diego, CA (US); Shao-Fu Shih, Mountain View, CA (US); Hakan Erdogan, Lexington, MA (US); Jamie Menjay Lin, San Diego, CA (US)

(73) Assignee: Google LLC, Mountain View, CA (US)

( * ) Notice: Subject to any disclaimer, the term of this patent is extended or adjusted under 35 U.S.C. 154(b) by 409 days.

(21) Appl. No.: 18/159,679

(22) Filed: Jan. 25, 2023

(65) Prior Publication Data

US 2024/0249741 A1  Jul. 25, 2024

(51) Int. Cl.
| | |
|---|---|
| *G10L 21/02* | (2013.01) |
| *G10L 15/06* | (2013.01) |
| *G10L 15/16* | (2006.01) |
| *G10L 15/22* | (2006.01) |
| *G10L 21/0232* | (2013.01) |
| *G10L 21/0308* | (2013.01) |
| *G10L 25/18* | (2013.01) |

(Continued)

(52) U.S. Cl.
CPC ........ *G10L 21/0232* (2013.01); *G10L 15/063* (2013.01); *G10L 15/16* (2013.01); *G10L 15/22* (2013.01); *G10L 21/0308* (2013.01); *G10L 25/18* (2013.01); *G10L 2021/02082* (2013.01); *G10L 2021/02166* (2013.01)

(58) Field of Classification Search
USPC ................ 704/232, 246, 247, 251, 252, 275
See application file for complete search history.

(56) References Cited

U.S. PATENT DOCUMENTS

| | | | |
|---|---|---|---|
| 2016/0071526 A1* | 3/2016 | Wingate | .................. G01S 3/807 704/233 |
| 2017/0186441 A1* | 6/2017 | Wenus | ..................... H04N 7/15 |

(Continued)

OTHER PUBLICATIONS

Choi et al., Phase-aware speech enhancement with deep complex U-Net, 2019.*

(Continued)

*Primary Examiner* — Leonard Saint-Cyr
(74) *Attorney, Agent, or Firm* — Honigman LLP; Brett A. Krueger; Grant Griffith

(57) ABSTRACT

A method includes receiving, as input, reference audio data representing a reference audio signal captured by an audio input device. The method also includes receiving, as input, from a beamformer, spatially-filtered audio data representing an output of the beamformer, the beamformer configured to spatially filter, based on additional audio data captured by one or more additional audio input devices, the reference audio data to attenuate one or more interfering signals in the spatially-filtered audio data. The method processes, using a trained guided speech-enhancement network, the reference audio data and the spatially-filtered audio data to generate, as output, enhanced audio data, the guided speech-enhancement network processing the reference audio data and the spatially-filtered audio data to further attenuate, in the enhanced audio data, the one or more interfering signals attenuated by the beamformer.

18 Claims, 7 Drawing Sheets

(51) Int. Cl.
  *G10L 21/0208* (2013.01)
  *G10L 21/0216* (2013.01)

(56) References Cited

U.S. PATENT DOCUMENTS

| | | | |
|---|---|---|---|
| 2021/0043220 A1 | 2/2021 | Baek et al. | |
| 2021/0297789 A1* | 9/2021 | De Haan | G10L 21/0216 |
| 2022/0124444 A1 | 4/2022 | Andersen et al. | |
| 2022/0319498 A1* | 10/2022 | Caroselli, Jr. | G10L 15/05 |
| 2023/0036986 A1* | 2/2023 | Visser | H04R 1/1083 |
| 2023/0186932 A1* | 6/2023 | Kurtz | H04R 3/005 |
| | | | 704/233 |
| 2023/0186934 A1* | 6/2023 | De Haan | G10L 21/0216 |
| | | | 381/94.1 |
| 2023/0276170 A1* | 8/2023 | Hong | G06F 1/1677 |
| | | | 381/92 |

OTHER PUBLICATIONS

Baek Soonho et al, "Deep Neural Network Based Multi-Channel Speech Enhancement for Real-Time Voice Communication Using Smartphones", 2022 IEEE International Conference on Consumer Electronics (ICCE), IEEE,Jan. 7, 2022 (Jan. 7, 2022), p. 1-5. XP034101819.
Yang Yang et al, "Guided Speech Enhancement Network", ICASSP 2023—2023 IEEE International Conference on Acoustics, Speech and Signal Processing (ICASSP), IEEE, Jun. 4, 2023 (Jun. 4, 2023), p. 1-5. XP034451280.
International Search Report and Written Opinion issued in related PCT Application No. PCT/US2024/012076, dated Mar. 27, 2024.
"Learning to Denoise Historical Music" Li et al. Oct. 16, 2020.
"U-net Convolutional Networks for Biomedical Image Segmentation" Ronnenberger 2015.

\* cited by examiner

GUIDED SPEECH ENHANCEMENT NETWORK

TECHNICAL FIELD

This disclosure relates to multi-microphone speech enhancement.

BACKGROUND

Voice is one of the primary methods of communication between individuals. As technology advances, speech as a computer interface has increasingly become essential to human-machine interactions. For reliable communication, a robust audio front-end is needed to enhance speech and combat various sources of degradation such as echo, background noise, interfering speech, and room reverberations. Robustness of automatic speech recognition (ASR) systems has significantly improved over the years with the advent of neural network-based end-to-end models, large-scale training data, and improved strategies for augmenting training data. Nevertheless, background interference can significantly deteriorate the ability of ASR systems to accurately recognize speech directed toward the ASR system. Background interference can be broadly classified into device echo, background noise, and competing speech.

To improve microphone capture quality, multiple microphones may be used to increase signal-to-noise ratio (SNR) and spatial resolution. The availability of multi-channel audio input provides spatial diversity and promises better separation of speech of interest and interference. Accordingly, smartphones, tablets, laptops, and smart speakers are increasingly equipped with multiple microphones.

SUMMARY

One aspect of the present disclosure provides a computer-implemented method that, when executed on data processing hardware, causes the data processing hardware to perform operations including receiving, as input, reference audio data representing a reference audio signal captured by an audio input device, and receiving, as input, from a beamformer, spatially-filtered audio data representing an output of the beamformer, the beamformer configured to spatially filter, based on additional audio data captured by one or more additional audio input devices, the reference audio data to attenuate one or more interfering signals in the spatially-filtered audio data. The operations also include processing, using a trained guided speech-enhancement network, the reference audio data and the spatially-filtered audio data to generate, as output, enhanced audio data, the guided speech-enhancement network processing the reference audio data and the spatially-filtered audio data to further attenuate, in the enhanced audio data, the one or more interfering signals attenuated by the beamformer.

Implementations of the disclosure may include one or more of the following optional features. In some implementations, the guided speech-enhancement network processes the reference audio data and the spatially-filtered audio data to preserve, in the enhanced audio data, speech of interest preserved by the beamformer. In some examples, the guided speech-enhancement network processes the reference audio data and the spatially-filtered audio data to reduce at least one of an echo, a reverberation, or a noise present in the reference audio data.

In some examples, a training process trains the guided speech-enhancement network by: generating simulated reference audio data including sampled speech of interest and one or more sampled interfering signals; generating, using a simulated beamformer model, simulated spatially-filtered audio data representing a simulated beamformer output; processing, using the guided speech-enhancement network, the simulated reference audio data and the simulated spatially-filtered audio data, to generate predicted enhanced audio data; and training the guided speech-enhancement network based on a loss term computed based on the predicted enhanced audio data and the speech of interest. Here the loss term may include a blind source separation signal-to-distortion ratio computed based on the predicted enhanced audio data and a ground truth, the ground truth including a convolution of a room impulse response and the speech of interest.

In some implementations, the guided speech-enhancement network includes a U-net model architecture. Here, the U-net model architecture may include: a Fourier transform layer; a contracting path including a plurality of two-dimensional (2D) convolution layers trained to successively reduce spatial information while increasing feature information; an expansion path including a plurality of 2D convolution layers trained to combine feature and spatial information through a sequence of up-convolutions and concatenations with high-resolution features from the contracting path; and an inverse Fourier transform layer.

In some examples, the audio input device and the one or more additional audio input devices are implemented by a user device. In other examples, the audio input device is implemented a user device, and the one or more additional audio input devices are associated with one or more additional user devices in communication with the user device. In some implementations, the operations also include providing the enhanced audio data to an automatic speech recognition system, a messaging application, an audio application, or an audio-video application.

Another aspect of the disclosure provides a system that includes data processing hardware and memory hardware in communication with the data processing hardware. The memory hardware stores instructions that when executed on the data processing hardware cause the date processing hardware to perform operations including receiving, as input, reference audio data representing a reference audio signal captured by an audio input device, and receiving, as input, from a beamformer, spatially-filtered audio data representing an output of the beamformer, the beamformer configured to spatially filter, based on additional audio data captured by one or more additional audio input devices, the reference audio data to attenuate one or more interfering signals in the spatially-filtered audio data. The operations also include processing, using a trained guided speech-enhancement network, the reference audio data and the spatially-filtered audio data to generate, as output, enhanced audio data, the guided speech-enhancement network processing the reference audio data and the spatially-filtered audio data to further attenuate, in the enhanced audio data, the one or more interfering signals attenuated by the beamformer.

Implementations of the disclosure may include one or more of the following optional features. In some implementations, the guided speech-enhancement network processes the reference audio data and the spatially-filtered audio data to preserve, in the enhanced audio data, speech of interest preserved by the beamformer. In some examples, the guided speech-enhancement network processes the reference audio data and the spatially-filtered audio data to reduce at least one of an echo, a reverberation, or a noise present in the reference audio data.

In some examples, a training process trains the guided speech-enhancement network by: generating simulated reference audio data including sampled speech of interest and one or more sampled interfering signals; generating, using a simulated beamformer model, simulated spatially-filtered audio data representing a simulated beamformer output; processing, using the guided speech-enhancement network, the simulated reference audio data and the simulated spatially-filtered audio data, to generate predicted enhanced audio data; and training the guided speech-enhancement network based on a loss term computed based on the predicted enhanced audio data and the speech of interest. Here the loss term may include a blind source separation signal-to-distortion ratio computed based on the predicted enhanced audio data and a ground truth, the ground truth including a convolution of a room impulse response and the speech of interest.

In some implementations, the guided speech-enhancement network includes a U-net model architecture. Here, the U-net model architecture may include: a Fourier transform layer; a contracting path including a plurality of two-dimensional (2D) convolution layers trained to successively reduce spatial information while increasing feature information; an expansion path including a plurality of 2D convolution layers trained to combine feature and spatial information through a sequence of up-convolutions and concatenations with high-resolution features from the contracting path; and an inverse Fourier transform layer.

In some examples, the audio input device and the one or more additional audio input devices are implemented by a user device. In other examples, the audio input device is implemented a user device, and the one or more additional audio input devices are associated with one or more additional user devices in communication with the user device. In some implementations, the operations also include providing the enhanced audio data to an automatic speech recognition system, a messaging application, an audio application, or an audio-video application.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
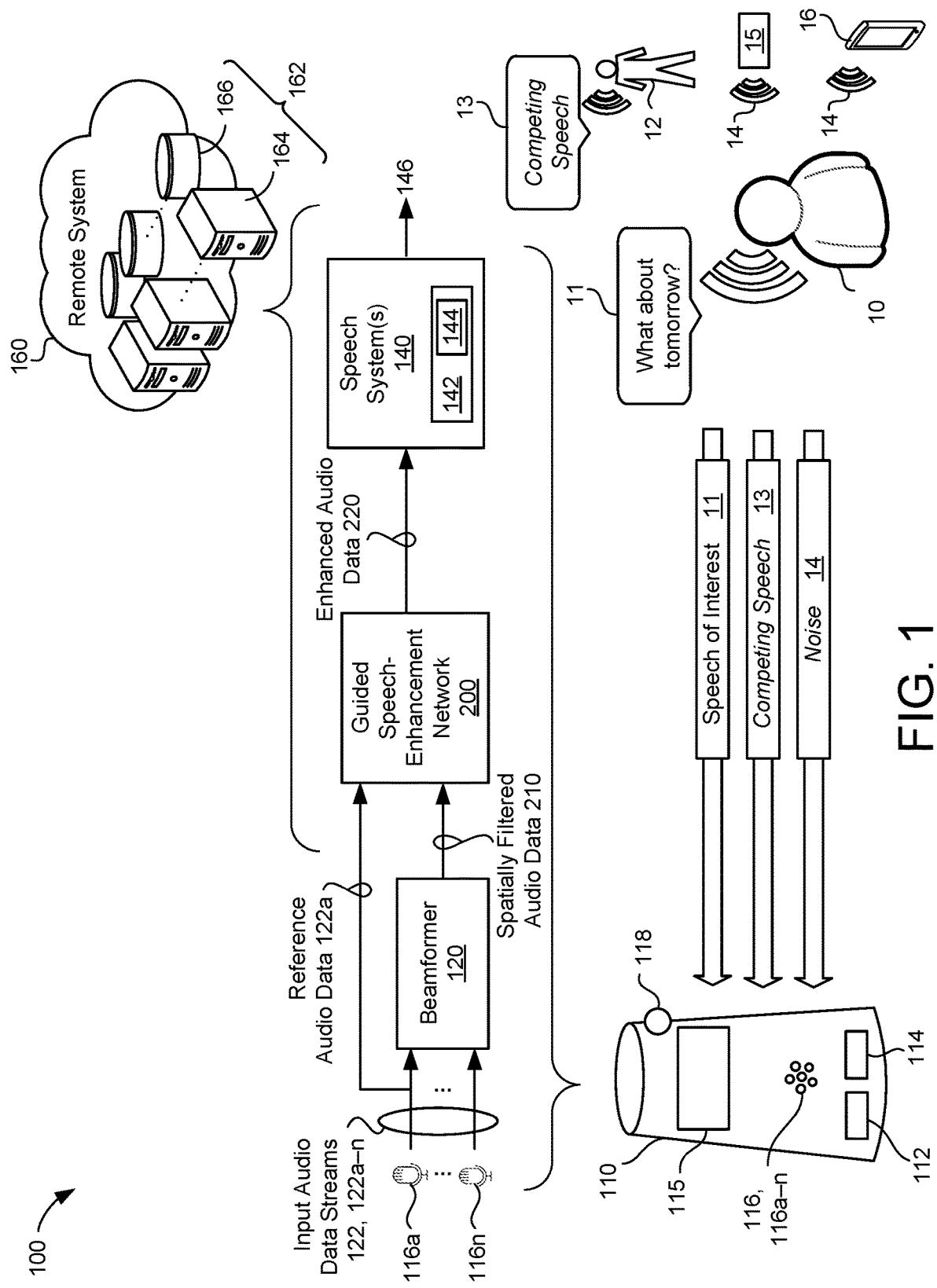
FIG. 1 is a schematic view of a system that includes a user communicating a spoken target utterance to a user device.

2 Multiple microphone-based speech enhancement has traditionally been decomposed into two decoupled stages: (1) a beamformer that provides spatial filtering based on multiple input signals captured using multiple microphones; and (2) a single-channel speech enhancement model that enhances a single-channel signal output by the beamformer. The beamformer spatially filters the multiple input signals to reduce interfering signals in the single-channel output signal. The design of a beamformer for a particular device is specific to the microphone geometry of the device. Recent research has shown the possibility of an end-to-end multi-channel neural network model, especially in the context of speech separation (e.g., separating speech of interest from interfering signals). However, such end-to-end neural network models tend to suffer from the requirements for a large quantity of training data and intense computational power, which typically prevents scaling such solutions to user devices. In addition, simulation-based training of multi-channel models does not generalize well to real-world conditions (e.g., to device-specific microphone geometries) due to acoustic mismatches.

Implementations herein include a guided speech-enhancement network that receives, as input: (1) reference audio data representing one raw input signal of a plurality of raw input signals; and (2) spatially-filtered audio data output by a beamformer that spatially filters the plurality of raw input signals to generate the spatially-filtered audio data. Here, the plurality of raw input signals are captured using corresponding ones of a plurality of microphones. The guided speech-enhancement network is trained to contrast the reference audio data and the spatially-filtered audio data and, thus, be guided by, or take cues from the spatial filtering and interfering signal reduction performed by the beamformer. That is, the guided speech-enhancement network is trained to further reduce the interfering signals that the beamformer reduced in enhanced audio data output by the guided speech-enhancement network, while preserving signals that the beamformer preserved. In this way, the guided speech-enhancement network leverages, or takes advantage of the spatial filtering performed by the beamformer instead of competing with, or integrating the spatial filtering performed by the beamformer. Notably, the guided speech-enhancement network may also be trained to provide additional speech enhancements such as, but not limited to, denoising and reverberation reduction in the same single model.

Advantageously, the guided speech-enhancement network may be trained as a standalone module (e.g., separate from the beamformer) using a relatively small training data set generated using a simulated generic beamformer model. That is, the guided speech-enhancement network may be trained independent of, or agnostic to any particular beamformer or any particular microphone arrangement. Notably, the resulting trained guided speech-enhancement network is highly transferable to a plurality of different devices independent of the particular microphone arrays and beamformers being used by the devices. That is, the trained guided speech-enhancement network does not need to be tailored to, or for any specific microphone arrangement or beamformer.

Referring to FIG. 1, in some implementations, a system 100 includes a user 10 communicating a spoken target utterance 11 (also referred to herein as speech of interest 11) to a speech-enabled user device 110 (also referred to herein as a device 110 or a user device 110) in a speech environment. The user 10 (i.e., speaker of the utterance 11) may speak the utterance 11 as a query or a command to solicit a response from the device 110. The device 110 may also capture interfering sounds from, for example, one or more other users 12 (e.g., competing speech 13), or non-speech signals 14 emitted by one or more noise sources 15 or one or more other user devices 16 within the speech environment. Here, the target utterance 11 spoken by the user 10 may be, for example, an audible query, a command for the device 110, or a speech-based communication captured by the device 110 (e.g., as part of a text messaging interaction based on transcribed audio, an audio interaction, or an audio-video interaction between the user 10 and another user). One or more speech-enabled systems 140 of the device 110 or associated with the device 110 may field the query for the command by answering the query and/or causing the command to be performed.

Implementations herein employ a beamformer 120 and a guided speech-enhancement network 200 for reducing the effects of interfering audio signals (e.g., the competing speech 13 and/or the noise 14) on the target utterance 11. In the example shown, the guided speech-enhancement network 200 and the beamformer 120 are implemented in conjunction with the speech system 140 for transcribing the target utterance 11 that specifies a query or command for the device 110. In particular, the beamformer 120 and the guided speech-enhancement network 200 reduce the amount of interfering signals that the speech system 140 has to contend with when transcribing the target utterance 11. However, the guided speech-enhancement network 200 and the beamformer 120 may be used with other systems such as, but not limited to, a speech-based text messaging system, an audio system (e.g., for a telephone call), or an audio-video system (e.g., for a video conference).

The device 110 may correspond to any computing device associated with the user 10 and capable of capturing a plurality of streams of input audio data 122, 122a-n. Some examples of user devices 110 include, but are not limited to, mobile devices (e.g., mobile phones, tablets, laptops, etc.), computers, wearable devices (e.g., smart watches, smart headphones, etc.), smart appliances, and internet of things (IoT) devices, smart speakers, vehicle infotainment systems, etc. The device 110 includes data processing hardware 112, and memory hardware 114 in communication with the data processing hardware 112 and storing instructions that, when executed by the data processing hardware 112, cause the data processing hardware 112 to perform one or more operations. In the example shown, the beamformer 120 executes on the data processing hardware 112. In some implementations, the guided speech-enhancement network 200 executes on the data processing hardware 112. In some examples, the speech system 140 also executes on the data processing hardware 112. However, the guided speech-enhancement network 200 or the speech system 140 may be executed by a remote system 160.

In some examples, the device 110 includes one or more applications (i.e., software applications) 115 where each application 115 may utilize enhanced audio data 220 generated by the guided speech-enhancement network 200 to perform various functions within the application 115. For instance, the device 110 may include an assistant application 115 configured to, responsive to the target utterance 11, communicate synthesized playback audio to the user 10 to assist the user 10 with various tasks.

The user device 110 further includes, or is in communication with, an audio subsystem with an array of two or more audio input devices (e.g., microphones) 116, 116a-n for capturing and converting audio signals present within the speech environment (e.g., the target utterance 11, the competing speech 13, and the noise 14)) into input audio data 122. Each microphone 116 of the array of microphones 116 captures raw input audio data 122 representing a corresponding different combination of the audio signals present within the speech environment based on the physical arrangement of the microphones 116 and the locations of the sources of the audio signals (e.g., the locations of the user 10, the user 12, the noise source 15, and the devices 16) within the speech environment. For example, a first microphone 116a may be closer to the user 10 than a second microphone 116b, while the second microphone 116b is closer to a noise source than the first microphone 116a. Thus, relative strengths of the target utterance 11, the competing speech 13, and the noise 14 in audio data outputs of the microphones 116a and 116b will differ. In some examples, outputs of the microphones 116 are sampled at a rate of 16 kHz to generate the streams of input audio data 122.

In some examples, the user device 110 includes the microphones 116. Additionally or alternatively, the user device 102 may be in communication with one or more microphones 116 separate, or remote from the user device 110. For example, the user device 110 may be a mobile device disposed within a vehicle and in wired or wireless communication (e.g., Bluetooth) with two or more microphones 116 of the vehicle. In some configurations, the user device 110 is in communication with least one microphone 116 residing on a separate device 111, which may include, without limitation, an in-vehicle audio system, a computing device, a speaker, or another user device. In these configurations, the user device 110 may also be in communication with the one or more microphones 116 residing on the user device 110. The user device 110 may also include a speech output device (e.g., a speaker) 118 for communicating an audible audio signal (e.g., a synthesized playback audio from the device 110).

In the example shown, the speech system(s) 140 include an automatic speech recognition (ASR) system 142 that employs an ASR model 144 to process the enhanced audio data 220 to generate a speech recognition result 146 (e.g., transcription) for the target utterance 11. The ASR system 142 may further include a natural language understanding (NLU) module (not shown for clarity of illustration) that performs semantic interpretation on the transcription of the target utterance 11 to identify the query/command directed toward the device 110. As such, the output 146 from the speech system 140 may include the transcription and/or instructions to fulfill the query/command identified by the NLU module.

In additional examples, the speech system(s) 140 is employed by one or more applications 115 executing on the user device 110 such as, without limitation, a digital assistant application, a messaging application, an audio application (e.g., a telephony application), or audio-video application (e.g., a video conferencing application). Here, the enhanced audio data 220 corresponding to the target utterance 11 is used by the messaging, audio, or audio-video application 115 to filter the voice of the target speaker 10 for communications to recipients during a messaging, audio, or audio-video communication session. The speech system(s)

140 may additionally or alternatively include a speaker identification model configured to perform speaker identification using the enhanced audio data 220 to identify the user 10 that spoke the target utterance 11.

In some examples, the device 110 communicates with the remote system 160 via a network (not shown for clarity of illustration). The remote system 160 may include resources 162, such as data processing hardware 164 (e.g., servers or CPUs) and/or memory hardware 166 (e.g., memory, databases, or other storage hardware). The device 110 may utilize the remote resources 162 to perform various functionality related to speech processing and/or synthesized playback communication. The guided speech-enhancement network 200 and the speech system(s) 140 may reside on the device 110 (referred to as on-device systems), or reside remotely (e.g., reside on the remote system 160), but in communication with the device 110. In some examples, one or more speech systems 140 reside locally or on-device while one or more other speech systems 140 reside remotely. In other words, one or more speech systems 140 leveraging the enhanced audio data 220 output from the guided speech-enhancement network 200 may be local or remote in any combination. For instance, when a speech system 140 is rather large in size or processing requirements, the system 140 may reside in the remote system 160. Yet, when the device 110 may support the size or the processing requirements of one or more speech systems 140, the one or more speech systems 140 may reside on the device 110 using the data processing hardware 112 and/or the memory hardware 114. Optionally, the one or more of the speech systems 140 may reside on both the user device 110 and remotely on the remote system 160. For instance, a speech system 140 may default to execute on the remote system 160 when a connection between the device 110 and remote system 160 is available, but execute locally on the device 110 when the connection is lost or unavailable.

The beamformer 120 spatially filters the streams of raw input audio data 122 captured by corresponding ones of the microphones 116 to generate spatially-filtered audio data 210 having a reduced amount of the interfering signals (e.g., the competing speech 13 and the noise 14). In particular, the beamformer 120 may use any number and/or type(s) of known methods or algorithms to spatially filter (e.g., combine) the streams of input audio data 122 to separate the various signals present in the speech environment such that the target utterance 11 coming from a primary direction or received strongest via a primary or reference microphone 116a can be identified and preserved in the spatially-filtered audio data 210 while interfering signals received from other directions can be attenuated in the spatially-filtered audio data 210. Notably, the beamformer 120 for a particular user device 110 is specific to the physical arrangement of the microphones 116 for or by the particular user device 110. That is, the beamformer 120 differs from user device to user device.

As shown, the guided speech-enhancement network 200 receives, as input: (i) reference audio data 122a corresponding to one of the streams of raw input audio data 122; and (ii) the spatially-filtered audio data 210 output by the beamformer 120. In the example shown, the reference audio data 122a corresponds to the audio data captured by a pre-selected reference or primary microphone 116a for the spatial filtering performed by the beamformer 120. The guided speech-enhancement network 200 is trained to contrast the reference audio data 122a and the spatially-filtered audio data 210 and, thus, be guided by, or take cues from the spatial filtering and interfering signal reduction performed the beamformer 120. The guided speech-enhancement network 200 is trained to further attenuate in the enhanced audio data 220 the same interfering signals that the beamformer 120 attenuated and to preserve signals that the beamformer 120 did not attenuate. In this way, the guided speech-enhancement network 200 leverages, or takes advantage of the spatial filtering performed by the beamformer 120 instead of competing with, or integrating the spatial filtering performed by the beamformer 120. By having both the reference audio data 122a and the spatially-filtered audio data 210, the trained guided speech-enhancement network 200 can infer the effect of the beamforming performed by the beamformer 120 and then use the inference to further reduce the directional interference. That is, the trained guided speech-enhancement network 200 infers a spectral contrast between the reference audio data 122a and the spatially-filtered audio data 210, and uses the contrast to enhance directionality based on spectral rejection. The guided speech-enhancement network 200 may also be trained to provide additional speech enhancements such as, but not limited to, echo cancelation, denoising, and reverberation reduction in a single model.

Notably, the guided speech-enhancement network 200 includes a causal streamable inference network that is capable of real-time streaming speech enhancement on input audio streams 122. That is, the guided speech-enhancement network 200 can be used in scenarios requiring speech enhancement with very low latency (i.e., in near real time). Notably, the guided speech-enhancement network 200 may be trained independent of any particular beamformer 120 or any particular microphone arrangement and is, thus, highly transferable to a plurality of different user devices. That is, the guided speech-enhancement network 200 can be trained to be generic to, applicable to, or can be executed on a wide range of user devices, even though the beamformer 120 and the microphone array of a particular user device are specific to that user device. In other words, the same guided speech-enhancement network 200 can be used on different user devices even though the physical arrangement of microphones 116 and the beamformer 120 vary from user device to user device.

Figure 2:
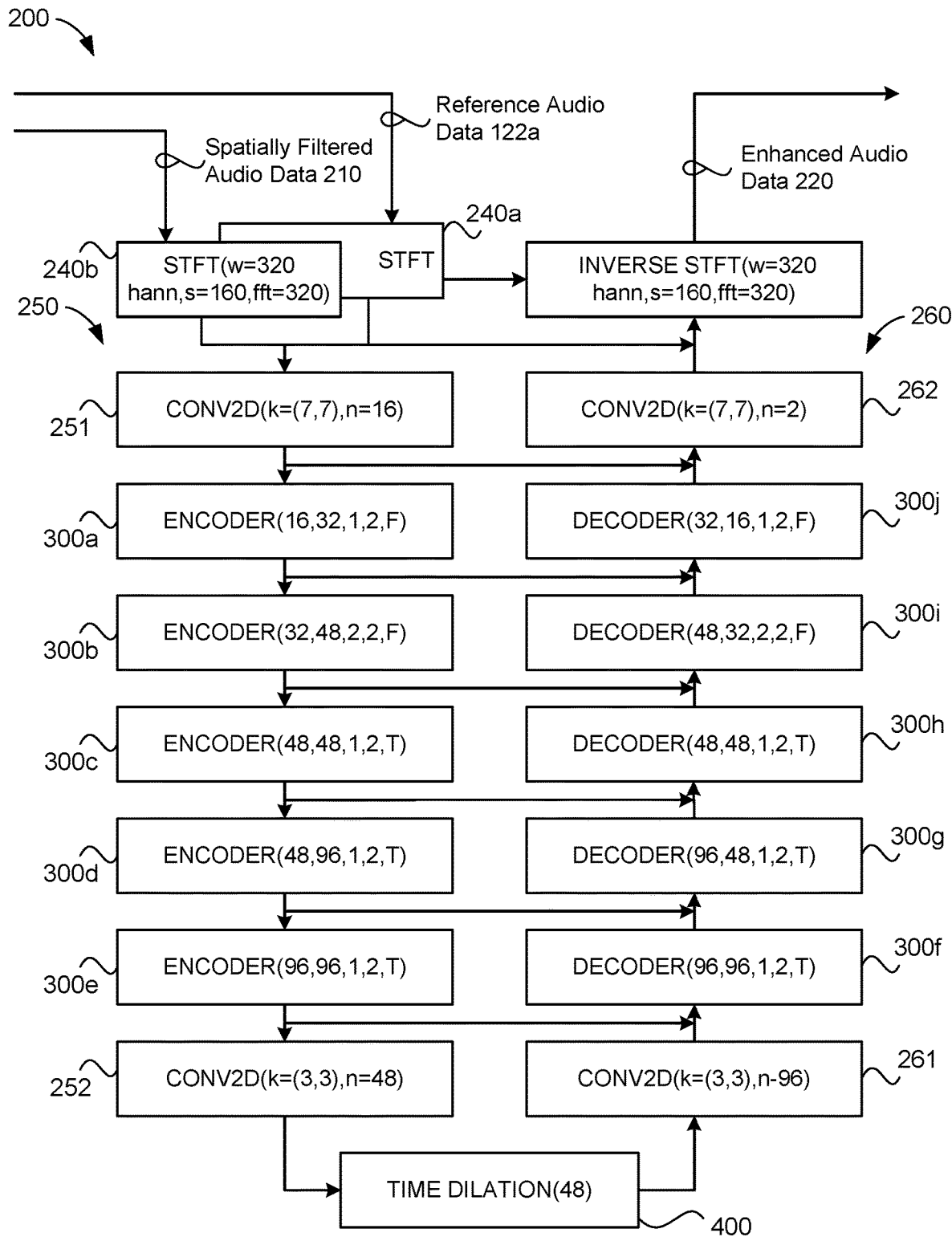
FIG. 2 is a schematic view of an example guided speech-enhancement network.

FIG. 2 is a schematic view of an example of the guided speech-enhancement network 200 of FIG. 1. The example guided speech-enhancement network 200 may include a U-net model architecture having symmetric encoders and decoders, and skip connections between each encoder and its mirrored decoder. However, the guided speech-enhancement network 200 may include, or be based on, other model architectures. FIG. 2 shows the details of a specific example configuration of the U-net model architecture. In the example shown, the two-dimensional (2D) convolution operations are performed causally to enable real-time streaming inference, and the 2D convolution operations include ring buffers to hold relevant input history so that inferences can be performed incrementally in time without losing history context.

The guided speech-enhancement network 200 performs operations in the frequency or spectral (rather than time) domain and, thus, the guided speech-enhancement network 200 includes short-time Fourier transform (STFT) layers 240a and 240b that compute corresponding Fourier transforms of corresponding ones of the reference audio data 122a and the spatially-filtered audio data 210, and outputs of the STFT layers 240a and 240b are concatenated.

The guided speech-enhancement network 200 includes a contracting path 250 that successively reduces spatial information while increasing feature information through repeated 2D convolutions. The contracting path 240 includes a first 2D convolution layer 251, a plurality of encoder layers 300, 300a-e, and a second 2D convolution layer 252. Each layer 251, 252, 300a-e of the contracting path 250 is followed by a leaky rectified linear unit (ReLU) with a slope coefficient of 0.3, and a max pooling operation. FIG. 2 depicts the configuration parameters for each of the layers 251, 252, 300a-e.

The guided speech-enhancement network 200 includes an expansion path 260 that combines feature and spatial information through a sequence of up-convolutions and concatenations with high-resolution features from the contracting path 250. The expansion path 260 includes a third 2D convolution layer 261, a plurality of decoder layers 300, 300f-j, and a final 2D convolution layer 262. FIG. 2 depicts the configuration parameters for each of the layers 261, 262, 300f-j.

The guided speech-enhancement network 200 includes a time dilation layer 400 between the contracting path 250 and the expansion path 260, and an inverse STFT layer 270 to convert an output of the final 2D convolution layer 262 in the spectral domain back to the time domain to generate the enhanced audio data 220.

In the example shown, the guided speech-enhancement network 200 performs an inference once every two STFT frames. With a sample rate of 16 kHz for the reference audio data 122a and the spatially-filtered audio data 210, and an STFT window of 20 ms (i.e., 320 samples) and a step size of 10 ms, the guided speech-enhancement network 200 has a latency of 30 ms. By way of comparison, a typical end-to-end voice over IP (VoIP) connection has a significantly greater latency of about 200 ms.

Figures 3, 4:
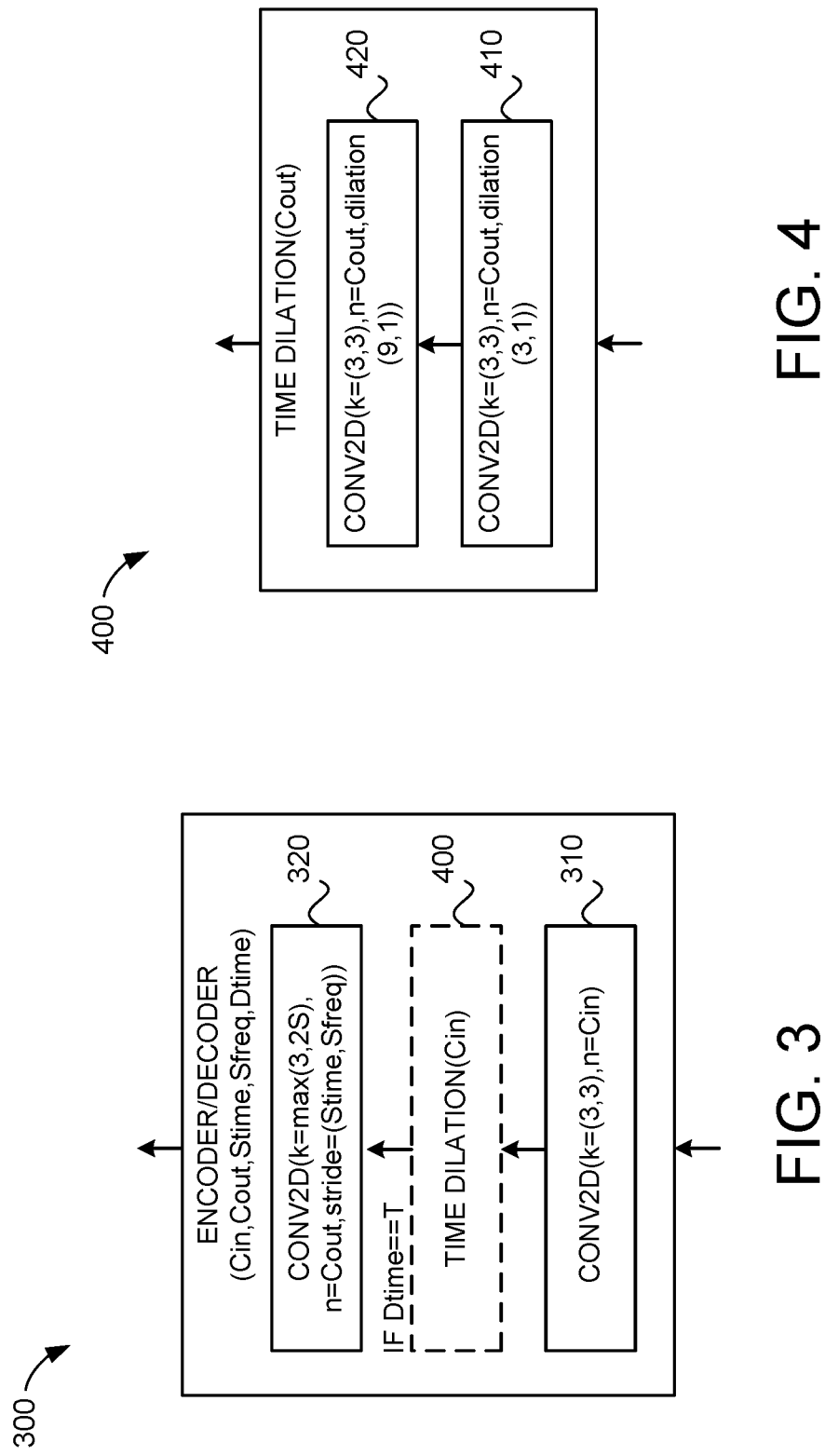
FIG. 3 is a schematic view of an example encoder or decoder block.
FIG. 4 is a schematic view of an example time dilation block.

FIG. 3 is a schematic view of an example encoder layer 300. The decoder layers 300 are arranged symmetrically to the encoder layers 300. That is, the order of the layers 310, 320, and 400 shown in FIG. 3 is reversed for a decoder layer 300. The configuration parameters in FIG. 3 for a particular encoder/decoder 300 are as specified in FIG. 2. For example, the encoder 300a has a set of parameters (Cin, Cout, Stime, Sfreq, Dtime)=(16, 32, 1, 2, F), wherein Dtime is a logical input equal to T for true, or F for false. The encoder/decoder layer 300 has two 2D convolutions layers 310 and 320, and an optional time dilation layer 400. The time dilation layer 400 is only performed when Dtime is equal to T. When the time dilation layer 400 is not performed, the 2D convolution layer 320 convolves the output of the 2D convolution layer 310. Otherwise, the time dilation layer 400 processes the output of the 2D convolution layer 310, and the 2D convolution layer 320 processes the output of the time dilation layer 400.

For an encoder 300, the 2D convolution layer 310 computes 2D convolution with a 3×3 kernel. With the example configuration parameters shown in FIG. 2, the 2D convolution layer 320 computes a 2D convolution with a stride of 1×2 if downsampling in the frequency dimension, or a stride of 2×2 if downsampling in both the time and frequency dimensions. The 2D convolution of the 2D convolution layer 320 is performed with a kernel size that is selected to be a multiple of the stride to ensure even contributions from all locations of an input feature map. For a decoder 300, the 2D convolution layer 320 first computes a transposed 2D convolution for up-sampling followed by the 3×3 2D convolution layer 310.

FIG. 4 is a schematic view of an example time dilation layer 400. The configuration parameters in FIG. 4 for a particular time dilation layer 300 are as specified in FIG. 2 or FIG. 3. For example, the time dilation layer 400 in FIG. 2 has a parameter Cout=48. The time dilation layer 400 includes two 2D convolution operations 410 and 420.

Figure 5:
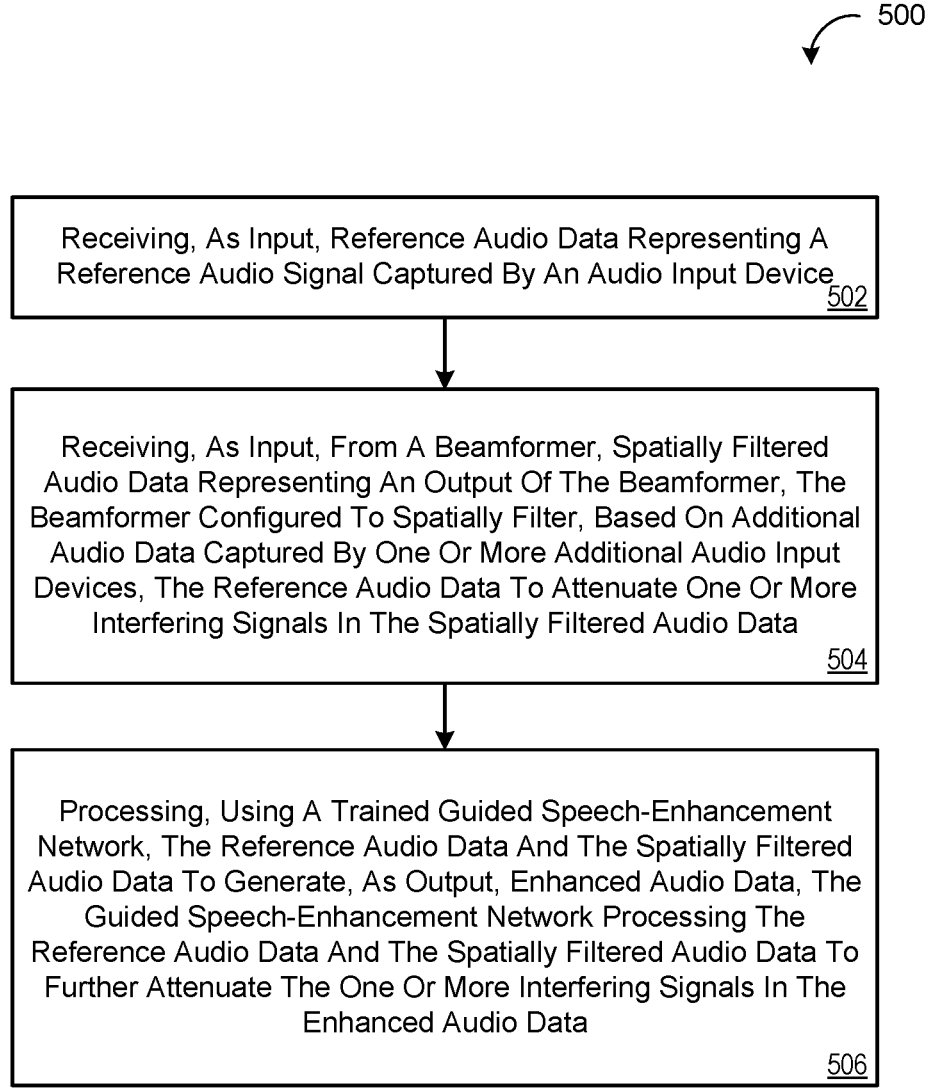
FIG. 5 is an example flowchart of an example arrangement of operations for improving speech quality using a guided speech-enhancement network.

FIG. 5 includes a flowchart of an example arrangement of operations for a method 500 of enhancing an audio signal using the guided speech-enhancement network 200. At operation 502, the method 500 includes receiving, as input, reference audio data 122a representing a reference audio signal captured by an audio input device 116a. At operation 504, the method 500 includes receiving, as input, from a beamformer 120, spatially-filtered audio data 210 representing an output of the beamformer 120. The beamformer 120 spatially filters, based on additional audio data 122b-n captured by one or more additional audio input devices 116b-n, the reference audio data 122a to attenuate one or more interfering signals (e.g., the competing speech 13 and the noise 14) in the spatially-filtered audio data 210.

At operation 506, the method 500 includes processing, using the trained guided speech-enhancement network 200, the reference audio data 122a and the spatially-filtered audio data 210 to generate, as output, enhanced audio data 220. The guided speech-enhancement network 200 processes the reference audio data 122a and the spatially-filtered audio data 210 to further attenuate the one or more interfering signals in the enhanced audio data 220 that were attenuated by the beamformer 120, while preserving the target utterance 11 preserved by the beamformer 120.

Figure 6:
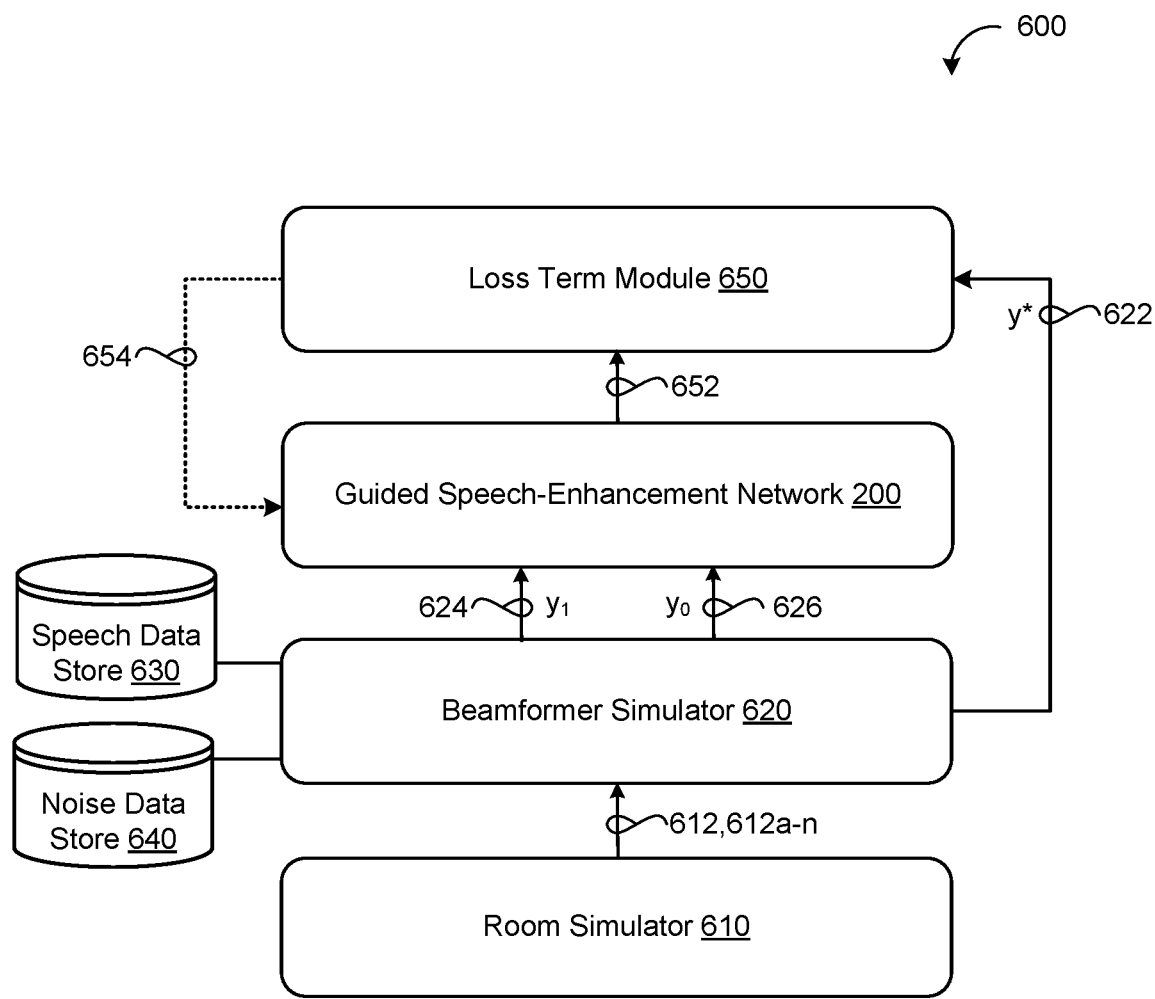
FIG. 6 is a schematic view of an example training process for training a guided speech-enhancement network.

FIG. 6 is a schematic view of an example training process 600 for training the guided speech-enhancement network 200 to enhance speech based on a speech enhancement performed by the beamformer 120. To train the guided speech-enhancement network 200 to be agnostic to microphone array configuration and beamformer implementation, the example training process 600 simulates the effect of a generic beamformer model using synthesized data and by controlling gains for different signal components.

The training process 600 includes a room simulator 610 for sampling or modeling room impulse responses r 612, 612a-n between a plurality of signal sources (e.g., 3 sources) and a plurality microphones 116 (e.g., 2 microphones). In some examples, the room simulator 610 samples or models, for each training sample, a randomly sampled room layout and random sampled source and receiver locations. The room simulator 610 denotes the room impulse response r 612 between a particular source k and a particular receiver j as $r_{(k,j)}$. Notably, because beamformers 120 typically do not introduce sample delays, the room simulator 610 samples the room impulse responses r 612, 612a-n assuming the microphones 116 are close to each other such that large sample offsets are not introduced.

The training process 600 includes a beamformer simulator 620 for generating paired training samples based the room impulse responses r 612 generated by the room simulator 610. In particular, the beamformer simulator 620 generates, based on speech of interest s 622 sampled from a speech data store 630, competing speech i sampled from the speech data store 630, and noise n sampled from a noise data store 640, (1) simulated reference audio data $y_1$ 624 and (2) simulated spatially-filtered audio data $y_0$ 626. The simulated reference audio data $y_1$ 624 and the simulated spatially-filtered audio data $y_0$ 626 are paired with a ground truth $y^*$ 622. The beamformer simulator 620 computes the ground truth $y^*$ 622 by convolving the room impulse response $r_{(0,0)}$ 612 with the speech of interest s. In some examples, the beamformer simulator 620 uses an anechoic version of the room impulse response $r_{(0,0)}$ to generate the ground truth $y^*$ 622 so that the guided speech-enhancement network 200 is also trained to, for example, denoise and reduce reverberations in the enhanced audio data 230 using a single model. In some implementations, the beamformer simulator 620 generates the simulated reference audio data $y_1$ 624 and the simulated spatially-filtered audio data $y_0$ 626 as $$y_0 = s * r_{(0,0)} + g_n \cdot n * r_{(1,0)} + p_i \cdot g_i \cdot i * r_{(2,0)} \qquad \text{EQN (1)}$$

$$y_1 = s * r_{(0,1)} + \alpha \cdot g_n \cdot n * r_{(1,1)} + \beta \cdot p_i \cdot g_i \cdot i * r_{(2,1)} \qquad \text{EQN (2)}$$

where * denotes temporal convolution, the powers of s, n, i and $r_{(k,j)}$ are normalized, $g_n$ and $g_i$ are random scalar gains common to both inputs that define the relative strengths of the noise n and the competing speech i compared with the target speech s, and pi is a Bernoulli random variable that models whether or not the interfering speech i is present. The effect of beamforming are represented by the random scalars $g_n$ and $g_i$ having values greater than one (1). Notably, in the beamformer model of EQN (1) and EQN (2), it is assumed that the beamformer 120 attenuates both the noise n and the interfering speech i, does not amplify or attenuate the speech of interest s, and does not introduce any sample delays. Thus, the simulated reference audio data $y_1$ 624 includes more noise n and interfering speech i than the spatially-filtered audio data $y_0$ 626. However, the relative contributions of the noise n and interfering speech i are adjusted by the random scalars $g_n$ and $g_i$. In some examples, values of the scalars $g_n$ and $g_i$ are determined by measuring input signals and the output signal of an actual beamformer and then used to generate the simulated reference audio data $y_1$ 624 and the simulated spatially-filtered audio data $y_0$ 626.

For each paired training sample (y* 626: $y_1$ 624, $y_0$ 626) generated by the beamformer simulator 620, the training process 600 processes, using the guided speech-enhancement network 200, the simulated reference audio data $y_1$ 624 and the simulated spatially-filtered audio data $y_0$ 626 to obtain predicted enhanced audio data 652.

Thereafter, for each paired training sample (y* 626: $y_1$ 624, $y_0$ 626), a loss term module 650 receives the predicted enhanced audio data 652, and computes a loss term 654 between the predicted enhanced audio data 652 and the ground truth y* 622. In some examples, the loss term module 650 computes the loss term 654 as a blind source separation signal-to-distortion ratio (BSS-SDR). Based on the term 654 output by the loss term module 650 for each training sample, the training process 600 trains the guided speech-enhancement network 200 to minimize the loss term 654.

Notably, while the effect of a real beamformer 120 is far more complex than captured in EQN (1) and EQN (2) (e.g., a real beamformer 120 may introduce specific patterns of amplitude and phase change as a function of the angle of arrival and signal frequency), it has been found that a guided speech-enhancement network 200 trained as shown in FIG. 6 works well with real beamformers 120.

Figure 7:
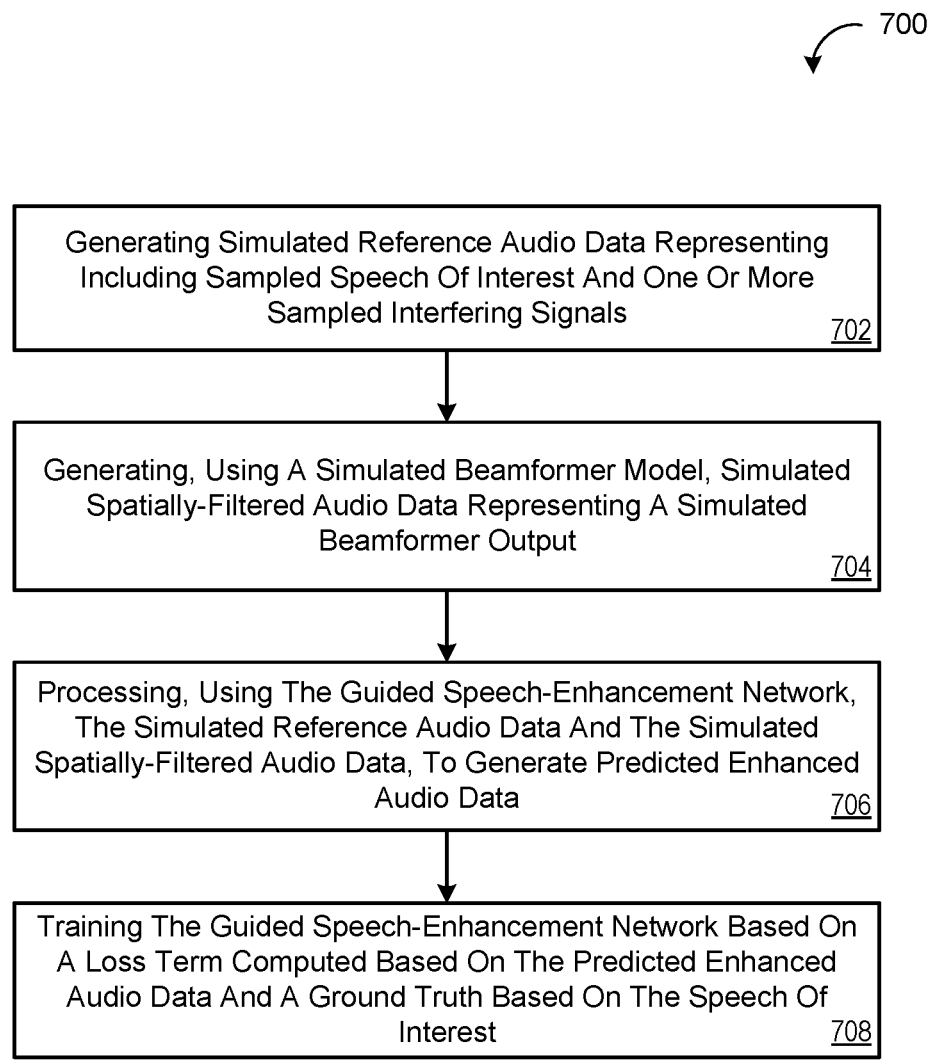
FIG. 7 is an example flowchart of an example arrangement of operations for training a guided speech-enhancement network.

FIG. 7 includes a flowchart of an example arrangement of operations for a method 700 of training the guided speech-enhancement network 200. At operation 702, the method 700 includes generating simulated reference audio data $y_1$ 624 including sampled speech of interest s and one or more sampled interfering signals (e.g., the noise n and/or the competing speech i). The method 700 includes, at operation 704, generating, using a simulated beamformer system 620 (e.g., using EQN (1) and EQN (2), simulated spatially-filtered audio data $y_0$ 626 representing a simulated beamformer output.

At operation 706, the method 700 includes processing, using the guided speech-enhancement network 200, the simulated reference audio data $y_1$ 624 and the simulated spatially-filtered audio data $y_0$ 626 to generate predicted enhanced audio data 652. At operation 708, the method 700 includes training the guided speech-enhancement network 200 based on a loss term 654 computed based on the predicted enhanced audio data 652 and a ground truth y* 622 that is based on the speech of interest s.

Figure 8:
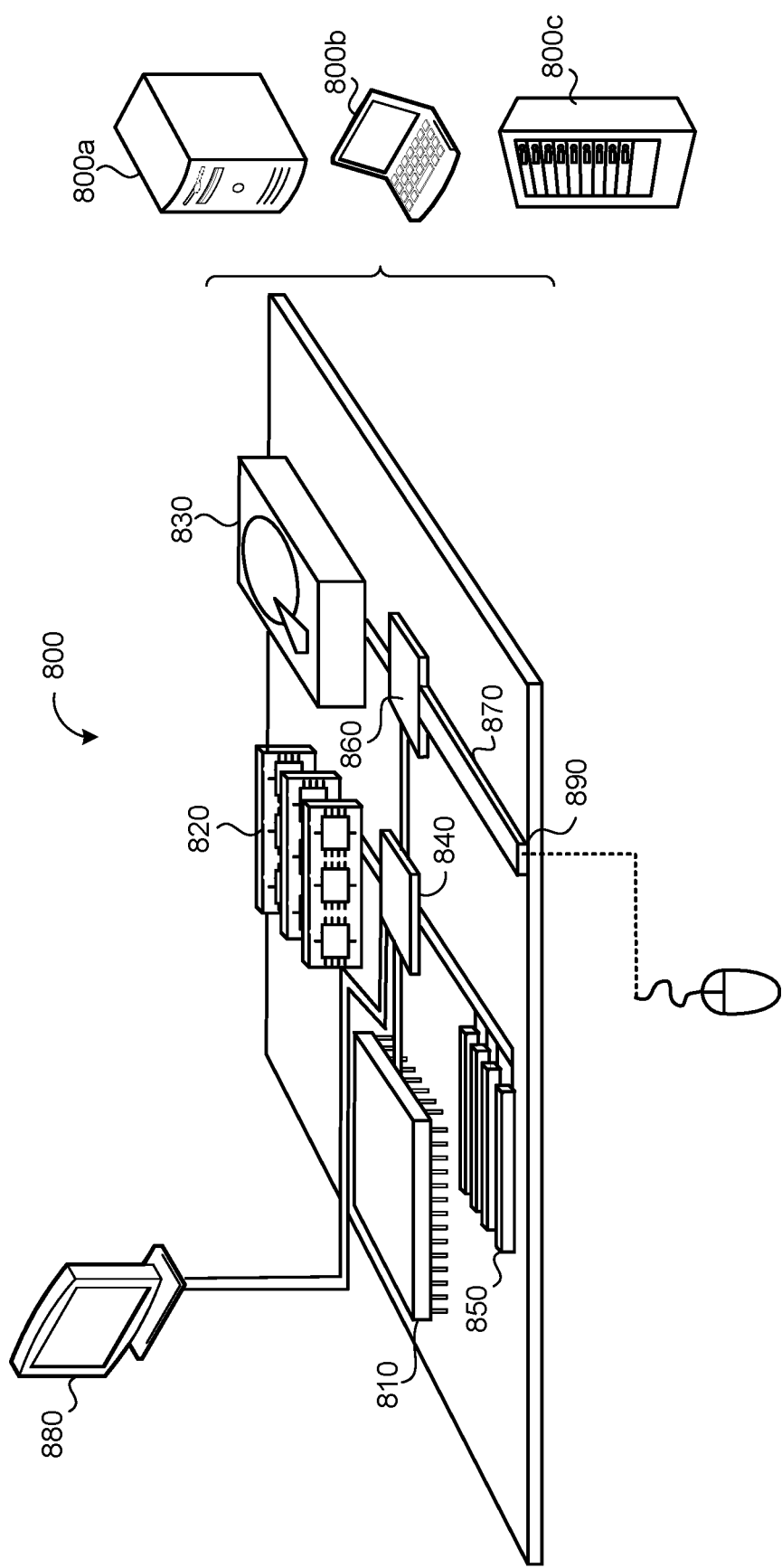
FIG. 8 is a schematic view of an example computing device that may be used to implement the systems and methods described herein.

FIG. 8 is schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the disclosures described and/or claimed in this document.

The computing device 800 includes a processor 810 (i.e., data processing hardware) that can be used to implement the data processing hardware 112 and 164), memory 820 (i.e., memory hardware) that can be used to implement the memory hardware 114 and 166), a storage device 830 (i.e., memory hardware) that can be used to implement the memory hardware 114 and 166 and the data stores 630 and 640, a high-speed interface/controller 840 connecting to the memory 820 and high-speed expansion ports 850, and a low speed interface/controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 (e.g., data processing hardware 112, 134 of FIG. 1) can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 (e.g., memory hardware 114, 136 of FIG. 1) stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800a or multiple times in a group of such servers 800a, as a laptop computer 800b, or as part of a rack server system 800c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:
   receiving, as input, reference audio data representing a reference audio signal captured by a primary audio input device, the primary audio input device pre-selected from an array of two or more audio input devices in communication with the data processing hardware;
   receiving, as input, from a beamformer, spatially-filtered audio data representing an output of the beamformer, the beamformer configured to spatially filter, based on the reference audio data captured by the primary audio input device and additional audio data captured by one or more additional audio input devices from the array of the two or more audio input devices, the reference audio data to attenuate one or more interfering signals in the spatially-filtered audio data; and
   processing, using a trained guided speech-enhancement network, the reference audio data and the spatially-filtered audio data to generate, as output, enhanced audio data, the guided speech-enhancement network processing the reference audio data and the spatially-filtered audio data to further attenuate, in the enhanced audio data, the one or more interfering signals attenuated by the beamformer,
   wherein a training process trains the guided speech-enhancement network by:
      generating simulated reference audio data comprising sampled speech of interest and one or more sampled interfering signals;
      generating, using a simulated beamformer model, simulated spatially-filtered audio data representing a simulated beamformer output;
      processing, using the guided speech-enhancement network, the simulated reference audio data and the simulated spatially-filtered audio data, to generate predicted enhanced audio data; and
      training the guided speech-enhancement network based on a loss term computed based on the predicted enhanced audio data and the speech of interest.

2. The computer-implemented method of claim 1, wherein the guided speech-enhancement network processes the reference audio data and the spatially-filtered audio data to preserve, in the enhanced audio data, speech of interest preserved by the beamformer.

3. The computer-implemented method of claim 1, wherein the guided speech-enhancement network processes the reference audio data and the spatially-filtered audio data to reduce at least one of an echo, a reverberation, or a noise present in the reference audio data.

4. The computer-implemented method of claim 1, wherein the loss term comprises a blind source separation signal-to-distortion ratio computed based on the predicted enhanced audio data and a ground truth, the ground truth comprising a convolution of a room impulse response and the speech of interest.

5. The computer-implemented method of claim 1, wherein the guided speech-enhancement network comprises a U-net model architecture.

6. The computer-implemented method of claim 5, wherein the U-net model architecture comprises:
   a Fourier transform layer;
   a contracting path comprising a plurality of two-dimensional (2D) convolution layers trained to successively reduce spatial information while increasing feature information;
   an expansion path comprising a plurality of 2D convolution layers trained to combine feature and spatial information through a sequence of up-convolutions and concatenations with high-resolution features from the contracting path; and
   and an inverse Fourier transform layer.

7. The computer-implemented method of claim 1, wherein the audio input device and the one or more additional audio input devices are implemented by a user device.

8. The computer-implemented method of claim 1, wherein:
   the audio input device is implemented a user device; and
   the one or more additional audio input devices are associated with one or more additional user devices in communication with the user device.

9. The computer-implemented method of claim 1, wherein the operations further comprise providing the enhanced audio data to an automatic speech recognition system, a messaging application, an audio application, or an audio-video application.

10. A system, comprising:
   data processing hardware;
   an array of two or more audio input devices in communication with the data processing hardware; and
   memory hardware in communication with the data processing hardware, the memory hardware storing instructions that when executed on the data processing hardware cause the data processing hardware to perform operations comprising:
      receiving, as input, reference audio data representing a reference audio signal captured by a primary audio input device, the primary audio input device pre-selected from the array of the two or more audio input devices in communication with the data processing hardware;
      receiving, as input, from a beamformer, spatially-filtered audio data representing an output of the beamformer, the beamformer configured to spatially filter, based on the reference audio data captured by the primary audio input device and additional audio data captured by one or more additional audio input devices from the array of the two or more audio input devices, the reference audio data to attenuate one or more interfering signals in the spatially-filtered audio data; and processing, using a trained guided speech-enhancement network, the reference audio data and the spatially-filtered audio data to generate, as output, enhanced audio data, the guided speech-enhancement network processing the reference audio data and the spatially-filtered audio data to further attenuate, in the enhanced audio data, the one or more interfering signals attenuated by the beamformer, wherein a training process trains the guided speech-enhancement network by:

generating simulated reference audio data comprising sampled speech of interest and one or more sampled interfering signals;

generating, using a simulated beamformer model, simulated spatially-filtered audio data representing a simulated beamformer output;

processing, using the guided speech-enhancement network, the simulated reference audio data and the simulated spatially-filtered audio data, to generate predicted enhanced audio data; and training the guided speech-enhancement network based on a loss term computed based on the predicted enhanced audio data and the speech of interest.

11. The system of claim 10, wherein the guided speech-enhancement network processes the reference audio data and the spatially-filtered audio data to preserve, in the enhanced audio data, speech of interest preserved by the beamformer.

12. The system of claim 10, wherein the guided speech-enhancement network processes the reference audio data and the spatially-filtered audio data to reduce at least one of an echo, a reverberation, or a noise present in the reference audio data.

13. The system of claim 10, wherein the loss term comprises a blind source separation signal-to-distortion ratio computed based on the predicted enhanced audio data and a ground truth, the ground truth comprising a convolution of a room impulse response and the speech of interest.

14. The system of claim 10, wherein the guided speech-enhancement network comprises a U-net model architecture.

15. The system of claim 14, wherein the U-net model architecture comprises:

a Fourier transform layer;

a contracting path comprising a plurality of two-dimensional (2D) convolution layers trained to successively reduce spatial information while increasing feature information;

an expansion path comprising a plurality of 2D convolution layers trained to combine feature and spatial information through a sequence of up-convolutions and concatenations with high-resolution features from the contracting path; and and an inverse Fourier transform layer.

16. The system of claim 10, wherein the audio input device and the one or more additional audio input devices are implemented by a user device.

17. The system of claim 10, wherein:

the audio input device is implemented a user device; and the one or more additional audio input devices are associated with one or more additional user devices in communication with the user device.

18. The system of claim 10, wherein the operations further comprise providing the enhanced audio data to an automatic speech recognition system, a messaging application, an audio application, or an audio-video application.

* * * * *